United States Patent [19]

Disselhorst et al.

[11] Patent Number: 5,653,916
[45] Date of Patent: Aug. 5, 1997

US005653916A

[54] PROCESS FOR THE MANUFACTURE OF SYNTHESIS GAS BY PARTIAL OXIDATION OF A GASEOUS HYDROCARBON-CONTAINING FUEL USING A MULTI-ORIFICE (CO-ANNULAR) BURNER

[75] Inventors: Johannes Hermanus Maria Disselhorst; Frits Eulderink; Hendrik Martinus Wentinck, all of Amsterdam, Netherlands

[73] Assignee: Shell Oil Company, Houston, Tex.

[21] Appl. No.: 499,155

[22] Filed: Jul. 7, 1995

[30] Foreign Application Priority Data

Jul. 22, 1994 [EP] European Pat. Off. ............ 94202150

[51] Int. Cl.$^6$ ........................................... C07C 1/02
[52] U.S. Cl. ........................................ 252/373; 48/197 R
[58] Field of Search ........................ 252/373; 48/197 R

[56] References Cited

U.S. PATENT DOCUMENTS

| 3,945,942 | 3/1976 | Marion et al. | 252/373 |
| 4,491,456 | 1/1985 | Schlinger | 48/197 R |
| 4,888,031 | 12/1989 | Martens | 48/197 R |

FOREIGN PATENT DOCUMENTS

| 098043 | 1/1984 | European Pat. Off. | C10J 3/46 |
| 343735 | 11/1989 | European Pat. Off. | C01B 3/36 |

OTHER PUBLICATIONS

Search Report of 21 Nov. 1995.

*Primary Examiner*—Gary Geist
*Assistant Examiner*—Sreeni Padmanabhan

[57] ABSTRACT

A process for the manufacture of synthesis gas by reacting oxygen-containing gas, applied as oxidizer and gaseous hydrocarbon-containing fuel in a reaction zone of a non-catalytic gas generator comprising the steps of injecting the said fuel and the said oxidizer into the reaction zone through a multi-orifice (co-annular) burner comprising arrangement of n separate passages or channels coaxial with the longitudinal axis of said burner, wherein n is an integer $\geq 2$ (2, 3, 4, 5 ...) wherein the $(n-1)^{th}$ passage is the inner passage with respect to the $n^{th}$ passage, measured from the longitudinal axis of the said burner, and wherein gaseous hydrocarbon-containing fuel and, optionally, a moderator is passed through one or more of the passages, but at least through the $n^{th}$ (outer) passage whereby at least one passage remains; oxidizer and, optionally, a moderator, is passed through one or more of the remaining passages, but at least through the $(n-1)^{th}$ passage. In any two adjacent passages in which oxidizer is passed through the one passage, and gaseous hydrocarbon-containing fuel is passed through the other passage, the said oxidizer has a higher velocity than said hydrocarbon-containing fuel.

11 Claims, No Drawings

PROCESS FOR THE MANUFACTURE OF SYNTHESIS GAS BY PARTIAL OXIDATION OF A GASEOUS HYDROCARBON-CONTAINING FUEL USING A MULTI-ORIFICE (CO-ANNULAR) BURNER

FIELD OF THE INVENTION

The present invention relates to a process for the manufacture of synthesis gas by partial oxidation of a gaseous hydrocarbon-containing fuel using a multi-orifice (co-annular) burner.

SUMMARY OF THE INVENTION

The invention relates to a process for partial oxidation of a gaseous hydrocarbon-containing fuel wherein an oxygen-containing gas, which is applied as an oxidizer, and a gaseous hydrocarbon-containing fuel are supplied to a gasification zone through a multi-orifice (co-annular) burner comprising a concentric arrangement of n passages or channels coaxial with the longitudinal axis of said burner, wherein n is an integer $\geq 2$, and wherein autothermically a gaseous stream containing synthesis gas is produced under appropriate conditions.

DETAILED DESCRIPTION OF THE INVENTION

In the present invention, the oxygen-containing gas, which is applied as an oxidizer, is usually air or (pure) oxygen or steam or a mixture thereof. In order to control the temperature in the gasification zone a moderator gas (for example steam, water or carbon dioxide or a combination thereof) can be supplied to said zone.

Those skilled in the art will know the conditions of applying oxidizer and moderator.

Synthesis gas is a gas comprising carbon monoxide and hydrogen, and it is used, for example, as a clean medium-calorific value fuel gas or as a feedstock for the synthesis of methanol, ammonia or hydrocarbons, which latter synthesis yields gaseous hydrocarbons and liquid hydrocarbons such as gasoline, middle distillates, lube oils and waxes.

In the specification and in the claims the term gaseous hydrocarbon-containing fuel will be used to refer to hydrocarbon-containing fuel that is gaseous at gasifier feed pressure and temperature.

According to an established process, synthesis gas is produced by partially oxidizing in a reactor vessel a gaseous fuel such as gaseous hydrocarbon, in particular petroleum gas or natural gas, at a temperature in the range of from 1000° C. to 1800° C. and at a pressure in the range of from 0.1 MPa to 6 MPa abs. with the use of an oxygen containing gas.

Synthesis gas will often be produced near or at a crude oil refinery because the produced synthesis gas can directly be applied as a feedstock for the production of middle distillates, ammonia, hydrogen, methanol or as a fuel gas, for example, for heating the furnaces of the refinery or more efficiently for the firing of gas turbines to produce electricity and heat.

In co-annular (multi-orifice) gas burners it has appeared that the burner lifetime is restricted by phenomena of pre-ignition or flame-flashback. Because of such phenomena the temperature of the burner-internals becomes too high and serious burner damage will occur. Further, there are problems with corrosion of the gas burner tips.

It is an object of the invention to provide a process for partial oxidation of a gaseous hydrocarbon-containing fuel wherein a good and rapid mixing or contacting of oxygen-containing gas (oxidizer), fuel and, optionally, moderator gas in the gasification zone is achieved beyond the exit of the burner and wherein burner-damage by corrosion, pre-ignition or flame-flash-back is suppressed.

The invention solves the above burner damage problem in that in the process of the invention the oxygen-containing gas applied as oxidizer and the gaseous hydrocarbon-containing fuel are supplied to the gasification zone through specific passages at specific velocities.

The invention therefore provides a process for the manufacture of synthesis gas by reacting oxygen-containing gas, applied as oxidizer, and gaseous hydrocarbon-containing fuel in a reaction zone of a substantially non-catalytic gas generator comprising the steps of injecting the said fuel and the said oxidizer into the reaction zone through a multi-orifice (co-annular) burner comprising an arrangement of n separate passages or channels coaxial with the longitudinal axis of said burner, wherein n is an integer $\geq 2$ (2, 3, 4, 5 . . . ), wherein the $(n-1)^{th}$ passage is the inner passage with respect to the $n^{th}$ passage, measured from the longitudinal axis of the said burner, and wherein the said gaseous hydrocarbon-containing fuel (optionally with a moderator gas) is passed through one or more of the passages, but at least through the nth passage, whereby at least one passage remains; the said oxidizer (optionally with a moderator gas) is passed through one or more of the remaining passages, but at least through the $(n-1)^{th}$ passage, and in such a manner that in any two adjacent passages in which oxidizer is passed through the one passage, and gaseous hydrocarbon-containing fuel is passed through the other passage, the said oxidizer has a higher velocity than said hydrocarbon-containing fuel.

In this manner the oxygen-containing gas (oxidizer) entrains the gaseous hydrocarbon-containing fuel after which the partial oxidation takes place in the gasification zone, and the burner-internal blades that form the internal separation wall between the oxygen-containing gas (oxidizer) and the hydrocarbon-containing gas and which have a finite thickness, are cooled by the oxygen-containing gas (oxidizer) and the hydrocarbon-containing gas (in particular by convective cooling) to lower the flame temperature just behind the tips.

Behind the tip of the blade there is unavoidably at least a recirculation area in which both gaseous fuel and oxygen-containing gas, applied as oxidizer, are present.

If the hydrocarbon-containing gas would have the highest velocity, there will be oxygen-rich conditions at the burner-internal-tip by means of "entrainment" which will lead to high flame temperatures, high tip temperatures and serious loss of burner material.

If the oxygen-containing gas, applied as oxidizer, has the highest velocity, in the recirculation area there will be mainly oxygen-depleted conditions, which will lead to lower flame temperature. Thus, serious burner damage will not occur, which leads to a long burner-lifetime.

Advantageously, for $n \geq 3$, at least part (e.g. 20%) of the gaseous hydrocarbon-containing fuel is passed through the said $n^{th}$ passage and the remainder of the gaseous hydrocarbon-containing fuel is passed through one or more of the remaining passages. The velocity of the oxygen-containing gas, applied as oxidizer, is advantageously 20–150 m/s.

The velocity of the gaseous hydrocarbon-containing fuel is advantageously 0.2–0.8 times the velocity of the oxygen-containing gas, applied as oxidizer, in any two adjacent passages in which oxidizer is passed through the one passage, and gaseous hydrocarbon-containing fuel is passed through the other passage.

In an advantageous embodiment of the invention the respective velocities are measured or calculated at the outlet of the said respective channels into the gasification zone. The velocity measurement or calculation can be carried out by those skilled in the art in any way suitable for the purpose and will therefore not be described in detail.

In another advantageous embodiment of the invention the moderator gas is steam and/or water and/or carbon dioxide and the oxidizer contains at least 90% pure $O_2$. In still another advantageous embodiment of the invention the gasification process is carried out at a pressure of 0.1–12 MPa abs.

Multi-orifice burners comprising arrangements of annular concentric channels for supplying oxygen:containing gas (oxidizer), fuel and moderator gas to a gasification zone are known as such (vide e.g. EP-A-0,545,281 and DE-OS-2, 935,754) and the mechanical structures thereof will therefore not be described in detail.

Usually such burners comprise a number of slits at the burner outlet and hollow wall members with internal cooling fluid (e.g. water) passages. The passages may or may not be converging at the burner outlet. Instead of comprising internal cooling fluid passages, the burner may be provided with a suitable ceramic or refractory lining applied onto or suspended by a means closely adjacent to the outer surface of the burner (front) wall for resisting the heat load during operation or heat-up/shut down situations of the burner.

No fuel passage is reserved for a fuel other than gaseous hydrocarbon-containing fuel.

The invention will now be described in more detail by reference to the following examples, which are included for illustrative purposes only and are not meant to limit the invention.

A number of examples are given in the Table. In this Table the following abbreviations are made:

Feed 1:

Natural Gas with the following typical composition
$CH_4$: 94.4% by volume
$C_2H_6$: 3.0%
$C_3H_8$: 0.5%
$C_4H_{10}$: 0.2%
$C_5H_{12}+$: 0.2%
$CO_2$: 0.2%
$N_2$: 1.5%

The supply temperature to the burner of this feedstock is 150°–250° C.

Feed 2:

Natural Gas with the following typical composition
$CH_4$: 81.8% by volume
$C_2H_6$: 2.7%
$C_3H_8$: 0.4%
$C_4H_{10}$: 0.1%
$C_5H_{12}+$: 0.1%
$CO_2$: 0.9%
$N_2$: 14.0%

$CO_2$ is supplied as a moderator gas to the said natural gas in such a manner that the mass ratio of moderator gas $CO_2$ to Natural Gas is 0.6–0.8. The supply temperature to the burner of this feedstock is 280°–320° C.

oxidizer 1: 99.5% pure $O_2$ with a temperature of 230°–250° C.

oxidizer 2: a mixture of a gas with 99.5% pure $O_2$ with 20–30% (by mass) of moderator gas. This mixture has a temperature of 250°–270° C. and the moderator gas is steam at a temperature of 280°–300° C.

A number of 9 examples has been presented. The following Table indicates the distributions of the respective fuels and oxidizers for these examples. The typical synthesis gas compositions are also given. The values of n as used in the description and claims are indicated and passage 1 is the first or central passage.

Table With Examples

| | Example number | | |
|---|---|---|---|
| | 1 | 2 | 3 |
| Value of n | 7 | 6 | 6 |
| Typical synthesis gas composition | 2–3 | 6–7 | 2–3 |
| $CO_2$ [% Vol, dry] | | | |
| CO [% Vol, dry] | 34–35 | 39–40 | 34–35 |
| $H_2$ [% Vol, dry] | 62–63 | 47–48 | 62–63 |
| Reactor pressure [MPa] | 4–5 | 2–3 | 5–7 |
| Reactor temperature [deg C.] | 1300–1400 | 1250–1350 | 1300–1400 |
| Passage 1 Type of gas | feed 1 | oxidizer 1 | oxidizer 1 |
| Mass flow [kg/s] | 1–1.5 | 1.2–1.8 | 1–1.5 |
| Velocity [m/s] | 30–45 | 80–120 | 50–75 |
| Passage 2 Type of gas | oxidizer 1 | feed 2 | feed 1 |
| Mass flow [kg/s] | 2.6–4 | 0.4–0.6 | 1.1–1.6 |
| Velocity [m/s] | 80–120 | 30–45 | 25–35 |
| Passage 3 Type of gas | feed 1 | feed 2 | oxidizer 1 |
| Mass flow [kg/s] | 2.1–3.1 | 2.1–3.1 | 2–3 |
| Velocity [m/s] | 30–45 | 80–120 | 50–75 |
| Passage 4 Type of gas | oxidizer 1 | feed 2 | feed 1 |
| Mass flow [kg/s] | 2.7–4 | 0.6–0.9 | 1.8–2.7 |
| Velocity [m/s] | 80–120 | 30–45 | 25–35 |
| Passage 5 Type of gas | feed 1 | oxidizer 1 | oxidizer 1 |
| Mass flow [kg/s] | 2.1–3.1 | 1.2–1.8 | 2–3 |
| Velocity [m/s] | 30–45 | 80–120 | 50–75 |
| Passage 6 Type of gas | oxidizer 1 | feed 2 | feed 1 |
| Mass flow [kg/g] | 3–4.5 | 0.76–1.1 | 1–1.5 |
| Velocity [m/s] | 80–120 | 30–45 | 20–30 |
| Passage 7 Type of gas | feed 1 | | |
| Mass flow [kg/s] | 1–1.5 | | |
| Velocity [m/s] | 30–45 | | |

| | Example number | | |
|---|---|---|---|
| | 4 | 5 | 6 |
| Value of n | 5 | 4 | 3 |
| Typical synthesis gas composition | 9–10 | 4–5 | 4–5 |
| $CO_2$ [% Vol, dry] | | | |
| CO [% Vol, dry] | 36–37 | 32–33 | 32–33 |
| $H_2$ [% Vol, dry] | 47–48 | 62–63 | 62–63 |
| Reactor pressure [Mpa] | 2–3 | 1–1.5 | 2–3 |
| Reactor temperature [deg C.] | 1200–1300 | 1300–1400 | 1300–1400 |
| Passage 1 Type of gas | feed 2 | feed 1 | feed 1 |
| Mass flow [kg/s] | 1–1.5 | 2–3 | 0.7–1.1 |
| Velocity [m/s] | 40–60 | 80–120 | 45–80 |
| Passage 2 Type of gas | oxidizer 2 | feed 1 | oxidizer 1 |
| Mass flow [kg/s] | 1.6–2.4 | 0.6–0.9 | 1.7–2.6 |
| Velocity [m/s] | 95–140 | 30–45 | 100–150 |
| Passage 3 Type of gas | feed 2 | oxidizer 2 | feed 1 |
| Mass flow [kg/s] | 2–3 | 6.2–9.3 | 0.9–1.3 |
| Velocity [m/s] | 40–60 | 80–120 | 35–40 |
| Passage 4 Type of gas | oxidizer 2 | feed 1 | moderator gas |
| Mass flow [kgls] | 1.6–2.4 | 1.3–2 | 0.6–0.9 |
| Velocity [m/s] | 70–100 | 25–35 | 55–80 |
| Passage 5 Type of gas | feed 2 | | |
| Mass flow [kg/s] | 1–1.5 | | |
| Velocity [m/s] | 30–45 | | |

| | Example number | | |
|---|---|---|---|
| | 7 | 8 | 9 |
| Value of n | 3 | 3 | 2 |
| Typical synthesis gas composition | 4–5 | 2–3 | 4–5 |
| $CO_2$ [% Vol, dry] | 4–5 | 2–3 | 4–5 |
| CO [% Vol, dry] | 32–33 | 34–35 | 32–33 |
| $H_2$ [% Vol, dry] | 62–63 | 62–63 | 62–63 |

-continued

Table With Examples

| Reactor pressure [Mpa] | 2–3 | 4–5 | 7–10 |
| --- | --- | --- | --- |
| Reactor temperature [deg C.] | 1300–1400 | 1300–1400 | 1300–1400 |
| Passage 1 Type of gas | oxidizer 2 | feed 1 | oxidizer 2 |
| Mass flow [kg/s] | 2.5–3.5 | 2–3 | 6–8 |
| Velocity [m/s] | 40–60 | 40–70 | 45–60 |
| Passage 2 Type of gas | oxidizer 2 | oxidizer 1 | feed 1 |
| Mass flow [kg/s] | 1.7–2.6 | 4–6 | 4–5.6 |
| Velocity [m/s] | 100–150 | 80–120 | 25–35 |
| Passage 3 Type of gas | feed 1 | feed 1 | |
| Mass flow [kg/s] | 2.5–3.7 | 1.3–2 | |
| Velocity [m/s] | 30–45 | 30–45 | |

It will be appreciated by those skilled in the art that any slit width suitable for the purpose can be applied, dependent on the burner capacity.

Advantageously, the first or central passage has a diameter up to 70 mm, whereas the remaining concentric passages have slit widths in the range of 1–20 mm.

Various modifications of the present invention will become apparent to those skilled in the art from the foregoing description. Such modifications are intended to fall within the scope of the appended claims.

What is claimed is:

1. A process for the manufacture of synthesis gas by reacting oxygen-containing gas, applied as oxidizer, and gaseous hydrocarbon-containing fuel in a reaction zone of a substantially non-catalytic gas generator comprising the steps of injecting the fuel and the oxidizer into the reaction zone through a multi-orifice co-annular burner comprising an arrangement of n separate passages or channels coaxial with the longitudinal axis of said burner, wherein n is an integer $\geq 2$, wherein the $(n-1)^{th}$ passage is the inner passage with respect to the $n^{th}$ passage, measured from the longitudinal axis of the said burner, and wherein the said gaseous hydrocarbon-containing fuel (optionally with a moderator gas) is passed through one or more of the passages, but at least through the $n^{th}$ passage, whereby at least one passage remains, the oxidizer, optionally with a moderator gas, is passed through one or more of the remaining passages, but at least through the $(n-1)^{th}$ passage, and in such a manner that in any two adjacent passages in which oxidizer is passed through the one passage, and gaseous hydrocarbon-containing fuel is passed through the other passage, the said oxidizer has a higher velocity than said hydrocarbon-containing fuel.

2. The process of claim 1 wherein the velocity of the gaseous hydrocarbon-containing fuel is 0.2–0.8 times the velocity of the oxygen-containing gas (oxidizer) in any two adjacent passages in which oxidizer is passed through the one passage, and gaseous hydrocarbon-containing fuel is passed through the other passage.

3. The process of claim 1 wherein, for $n \geq 3$, at least the gaseous hydrocarbon-containing fuel is passed through the said $n^{th}$ passage and the remainder of the gaseous hydrocarbon-containing fuel is passed through one or more of the remaining passages.

4. The process of claim 1 wherein the velocity of the oxidizer is 20–150 m/s.

5. The process of claim 1 wherein the process pressure is 0.1–12 MPa.

6. The process claim 1 wherein the fuel is natural gas.

7. The process of claim 1 wherein the oxidizer contains at least 90% pure oxygen.

8. The process of claim 1 wherein the respective velocities are measured or calculated at the outlet of the said respective concentric passages or channels into the gasification zone.

9. The process of claim 1 wherein the moderator gas is steam, carbon dioxide or water or a combination thereof.

10. The process of claim 1 wherein moderator gas is passed through an $(n+1)^{th}$ passage.

11. The process of claim 1 wherein no fuel passage is reserved for a fuel other than gaseous hydrocarbon-containing fuel.

* * * * *